US010572442B2

(12) United States Patent
Eguro et al.

(10) Patent No.: US 10,572,442 B2
(45) Date of Patent: Feb. 25, 2020

(54) SYSTEMS AND METHODS FOR PROVIDING DISTRIBUTED TREE TRAVERSAL USING HARDWARE-BASED PROCESSING

(71) Applicant: Microsoft Technology Licensing, LLC, Redmond, WA (US)

(72) Inventors: Kenneth H. Eguro, Seattle, WA (US); Zsolt Istvan, Zurich (CH); Arvind Arasu, Redmond, WA (US); Ravishankar Ramamurthy, Redmond, WA (US); Kaushik Shriraghav, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 771 days.

(21) Appl. No.: 14/555,275

(22) Filed: Nov. 26, 2014

(65) Prior Publication Data
US 2016/0147779 A1 May 26, 2016

(51) Int. Cl.
*G06F 17/30* (2006.01)
*G06F 16/11* (2019.01)
*G06F 16/172* (2019.01)
*G06F 16/901* (2019.01)
*G06F 16/22* (2019.01)
(Continued)

(52) U.S. Cl.
CPC .......... *G06F 16/122* (2019.01); *G06F 16/172* (2019.01); *G06F 16/2246* (2019.01); *G06F 16/24539* (2019.01); *G06F 16/24552* (2019.01); *G06F 16/9027* (2019.01)

(58) Field of Classification Search
CPC ......... G06F 17/30082; G06F 17/30132; G06F 17/3048; G06F 17/30457; G06F 17/30327; G06F 17/30961; G06F 16/122; G06F 16/172; G06F 16/24539; G06F 16/2246; G06F 16/24552; G06F 16/9027
USPC ........ 707/999.002, 99.003, 999.001, 999.01, 707/797, 694
See application file for complete search history.

(56) References Cited

U.S. PATENT DOCUMENTS

| 5,822,749 | A | | 10/1998 | Agarwal | |
|---|---|---|---|---|---|
| 5,842,196 | A | * | 11/1998 | Agarwal | ........... G06F 17/30327 |
| 5,978,789 | A | * | 11/1999 | Griffin | .............. G06F 17/30471 |

(Continued)

OTHER PUBLICATIONS

Arasu, et al., "A Secure Coprocessor for Database Applications", 2013 23rd International Conference on Field Programmable Logic and Applications, IEEE, Sep. 2, 2013, pp. 1-8, retrieved on Oct. 23, 2013.

(Continued)

*Primary Examiner* — Shiow-Jy Fan
(74) *Attorney, Agent, or Firm* — Schwegman Lundberg & Woessner, P.A.

(57) ABSTRACT

A database management system (DBMS) run a host CPU and a hardware coprocessor accelerate traversal of a tree-type data structure by allocating reusable memory in cache to store portions of the tree-type data structure as the tree-type data structure is being requested by the host CPU. The hardware coprocessor manages the cached tree-type data structure in a manner that is transparent to the host CPU. A driver located at the host CPU or at a separate computing device can provide an interface between the host CPU and the hardware coprocessor, thus reducing communications between the host CPU and the hardware coprocessor.

20 Claims, 14 Drawing Sheets

(51) Int. Cl.
*G06F 16/2455* (2019.01)
*G06F 16/2453* (2019.01)

(56) References Cited

U.S. PATENT DOCUMENTS

| | | | | |
|---|---|---|---|---|
| 6,052,720 | A * | 4/2000 | Traversat | H04L 29/06 707/E17.012 |
| 6,144,983 | A * | 11/2000 | Klots | G06F 9/52 707/999.008 |
| 6,148,294 | A * | 11/2000 | Beyda | G06F 17/30126 |
| 6,405,252 | B1 * | 6/2002 | Gupta | H04L 12/14 370/229 |
| 6,950,823 | B2 | 9/2005 | Amiri et al. | |
| 7,584,294 | B2 | 9/2009 | Plamondon | |
| 7,991,956 | B2 | 8/2011 | Illikkal et al. | |
| 8,078,642 | B1 | 12/2011 | Poutanen | |
| 8,229,918 | B2 | 7/2012 | Branscome et al. | |
| 9,002,824 | B1 * | 4/2015 | Sherry | G06F 17/30371 707/718 |
| 2001/0049747 | A1 * | 12/2001 | Stanbach | G06F 17/3089 709/245 |
| 2003/0172059 | A1 * | 9/2003 | Andrei | G06F 17/30454 |
| 2005/0198062 | A1 | 9/2005 | Shapiro | |
| 2007/0050326 | A1 * | 3/2007 | Budhabhatti | G06F 17/30955 |
| 2007/0112851 | A1 * | 5/2007 | Tomic | G06F 17/2247 |
| 2007/0250471 | A1 * | 10/2007 | Fontoura | G06F 17/30923 |
| 2007/0294499 | A1 * | 12/2007 | Garthwaite | G06F 12/0253 711/170 |
| 2009/0077120 | A1 * | 3/2009 | Warrren | G06F 17/30595 |
| 2009/0254513 | A1 * | 10/2009 | Luukkala | G06F 17/30153 |
| 2010/0031267 | A1 * | 2/2010 | Maessen | G06F 9/5066 718/105 |
| 2013/0080395 | A1 * | 3/2013 | Gong | G06F 17/30289 707/661 |
| 2014/0040199 | A1 * | 2/2014 | Golab | G06F 17/30309 707/634 |
| 2014/0258340 | A1 | 9/2014 | Crowthers et al. | |
| 2017/0004164 | A1 * | 1/2017 | Tucek | G06F 17/30477 |

OTHER PUBLICATIONS

Babb, "Implementing a Relational Database by Means of Specialized Hardware", ACM Transactions on Database Systems,, vol. 4, No. 1, Mar. 1, 1979, pp. 1-29.

Elmasri, et al., "Chapter 23: Database Recovery Techniques", Jan. 1, 2007, Fundamentals of Database Systems Sixth Edition, Addison-Wesley, pp. 807-832.

Gray, et al., "Transaction Processing: Concepts and Techniques—Chapter 13—File and Buffer Management", Jan. 1, 1993, Morgan Kaufmann, San Mateo, CA, pp. 661-747.

Mykletun, et al., "Incorporating a Secure Coprocessor in the Database-as-a-Service Model", Innovative Architecture for Future Generation High-Performance Process ORS and Systems, 2005 Oahu, HI, Jan. 17-19, 2005, IEEE, Jan. 17, 2005, pp. 38-44.

Ohn, et al., "Maintaining Cache Coherence for B+ Tree Indexes in a Shared Disks Cluster", In: "Correct System System Design", Jun. 28, 2004, Springer International Publishing, vol. 3402, pp. 410-423.

The PCT Search Report and Written Opinion dated Feb. 17, 2016 for PCT application No. PCT/US2015/061715, 15 pages.

Sellis, et al., "Intelligent Caching and Indexing Techniques for relational Database Systems", Information Systems, Peramon Press, Oxford, GB, vol. 13, No. 2, Jan. 1, 1998, pp. 175-178, retrieved on Jan. 1, 1988.

International Preliminary Report on Patentability Issued in corresponding PCT Patent Application No. PCT/US2015/061715, dated Feb. 9, 2017, 7 Pages.

Coole, et al., "Traversal Caches: A First Step towards FPGA Acceleration of Pointer-Based Data Structures", International Journal of Reconfigurable Computing, vol. 2010, Mar. 2010, 16 pages.

Arasu, et al., "Transaction Processing on Confidential Data using Cipherbase", In Technical Report No. MSR-TR-2014-106, Aug. 2014, 15 pages.

Yang, et al., "A Programmable Memory Hierarchy for Prefetching Linked Data Structures", In Proceedings of the 4th International Symposium on High Performance Computing, May 15, 2002, 14 pages.

Karabiber, et al., "A Fast and Efficient Hardware Technique for Memory Allocation", Retrieved on Sep. 16, 2014 from <<http://www.emo.org.tr/ekler/0b5ad024f939250_ek.pdf>>, 5 pages.

The PCT Written Opinion of the International Preliminary Examining Authority dated Oct. 13, 2016 for PCT application No. PCT/US2015/061715, 5 pages.

"Office Action Issued in European Patent Application No. 15802327.5", dated Nov. 8, 2018, 8 Pages.

Gray, J., et al., "Chapter 14—The Tuple-Oriented File System", Published in Book Transaction Processing: Concepts and Techniques, Morgan Kaufmann Publishers, Inc., San Francisco, CA, 1993, pp. 754-757, 760, and 762 (8 Pages).

Gray, J., et al., "Chapter 15—Access Paths", Published in Book Transaction Processing: Concepts and Techniques, Morgan Kaufmann Publishers, Inc., San Francisco, CA, 1993, pp. 829-913.

* cited by examiner

SYSTEMS AND METHODS FOR PROVIDING DISTRIBUTED TREE TRAVERSAL USING HARDWARE-BASED PROCESSING

BACKGROUND

Today's database systems have to execute many queries on large databases, e.g., Google has to answer about one billion search queries per day. To keep the response time low, queries must be executed as fast as possible. Queries are the interface between the database management systems, which hold the databases, and the database applications, which rely on data stored in such databases. Therefore, speeding up query execution increases the performance of database systems, and the database applications would benefit from a lowered response time.

Dedicated and reconfigurable hardware accelerators have a long history of improving database queries, especially the throughput, latency, and power requirements of computations as compared to conventional software-based processors. At the same time though, the dedicated nature of these types of devices also generally means that they can perform only relatively simple functionality, requiring software-based processing to complete a task, or at least act as backup processing. This distributed processing can lead to synchronization and/or consistency issues between the two systems.

Field programmable gate arrays (FPGAs) and other hardware logic devices (e.g., application-specific integrated circuits (ASICs) and complex programmable gate arrays (CPGAs) have been used to accelerate the storage and traversal of tree data structures. Current solutions take one of two general approaches: caching by means of a content-addressable memory structure and FPGA accelerators for trees, where tree nodes are laid out in dedicated register-transfer level (RTL) logic. The first type of solution has two drawbacks. First, it is usually characterized by an explicit caching policy, where the host (e.g., database management system (DBMS)) must make decisions regarding storing/updating items in a cache. Second, the data structures most often used do not provide very high memory efficiency. The second type of solution also has two primary drawbacks. First, because entire trees are directly represented in the hardware, they consume large amounts of on-chip memory/logic. Second, the tree structure that is implemented is very rigid, making dynamic updates to the tree structure difficult to handle quickly and economically.

SUMMARY

This disclosure describes systems and methods for caching and processing tree-like data structures in hardware.

An example system includes a database management system (DBMS), a driver, and a logic device. The DBMS and the driver are at least partially embodied in a computer-readable media executable by one or more processors. The DBMS receives a query for information stored in one or more tree-type relational database data-structures and, in response to receiving the query, sends a query to the driver. The driver, in response to receiving the query from the DBMS, sends a modified query to the logic device that is at least partially embodied in hardware. The logic device includes cache memory for storing a tree-type relational database data-structure associated with at least a portion of one of the one or more tree-type relational database data-structures associated with the DBMS. The logic device, in response to receiving the modified query, traverses nodes of the tree-type relational database data-structure stored in the cache memory, based at least on the modified query, retrieves portions of data located at each traversed node; and sends the retrieved portions of data to the driver.

The driver validates the portions of the data based on data stored at the tree-type relational database data-structure associated with the DBMS and sends the validated portions of the data to the DBMS, in response to receiving the portions of data. Unvalidated or inconsistent portions of the data are re-sent to the logic device. The driver stores portions of the data received from the hardware logic device as nodes within a lookup table (LUT) and uses the LUT to reply to query received from the DBMS.

In other examples, the logic device allocates a page within a cache memory associated with the logic device for a node associated with the received query, the node data and the path information based at least on allocation rules when the cache memory does not currently include a page associated with the node that is associated with the received query. The logic device sequentially allocates pages based at least on reception of the received query, the node data and the path information. The cached pages include a value location that stores values and a pointer location that stores one or more pointers. The pointer location is logically separated from the value location within the cache memory.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the leftmost digit(s) of a reference number identifies the figure in which the reference number first appears. The same reference numbers in different figures indicate similar or identical items.

FIGS. 3-1 and 3-2 show block diagrams depicting example database management software components and a driver software component used by the database management system.

FIGS. 5-1 and 5-2 show a flow diagram depicting an example operation of interaction between the components of the database management system.

FIGS. 7-1 and 7-2 show a flow diagram of verifying results at the software components of the database management system.

FIGS. 8-1 and 8-2 graphically illustrate interaction between the logic device and the software components.

DETAILED DESCRIPTION

Overview

Figure 1:
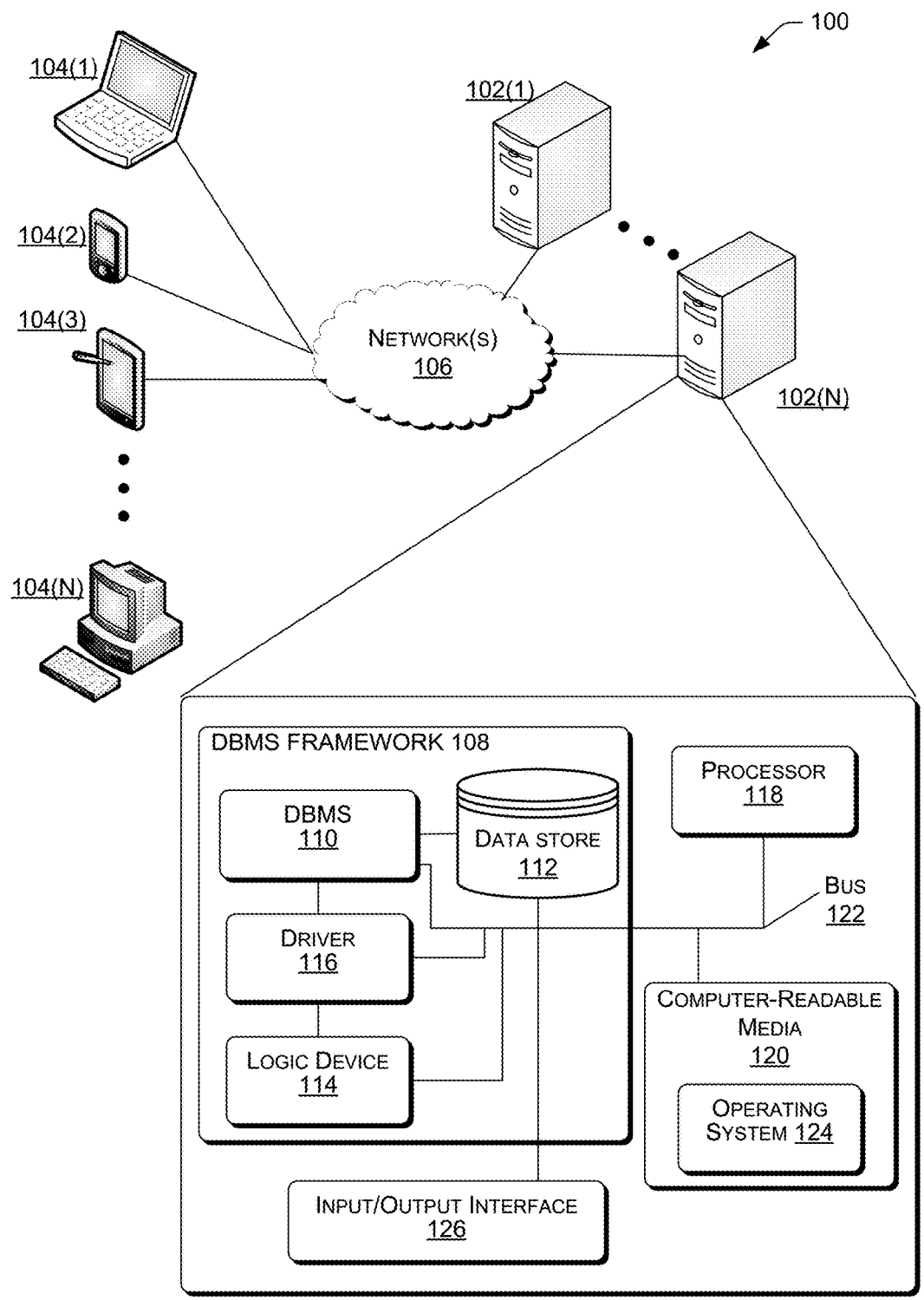
FIG. 1 is a diagram depicting an example environment for implementing a database management system.

Examples described herein provide constructs of a system having a host central processing unit (CPU) (e.g., running a database management system (DBMS)) and a hardware coprocessor that can perform operations related to a cached tree-type data structure associated with a complete tree-type data structure maintained by the DBMS.

The hardware coprocessor can accelerate traversal of the tree-type data structure by allocating reusable memory in a cache to store portions of the tree-type data structure as tree-type data structure requests are provided by the DBMS. The hardware coprocessor can manage the cached tree-type data structure in a manner that is transparent to the DBMS. Also, a driver module can be located in a computing device separate from the DBMS or can be located at the same computing device as the DBMS. The driver module can provide an interface between the DBMS and the hardware coprocessor, thus reducing communications between the DBMS and the hardware coprocessor.

The driver module can provide tree-level queries based on node-level queries associated with a tree-type data structure that the DBMS sends to the driver module. The driver module can send the tree-level queries to the hardware coprocessor. The hardware coprocessor can return to the driver tree-level results based on the tree-level queries provided by the driver module. The driver module can receive and verify results sent from the hardware coprocessor. The results sent from the hardware coprocessor can include values associated with each node of the cached tree-type data structure that the hardware coprocessor found during a traversal, based on the received tree-level query and tree identification information sent by the driver module. The driver module can send verified results to the DBMS. Inconsistent results associated with one or more of the nodes of the cached tree-type data structure can cause a follow-up communication to occur between the hardware coprocessor and the driver module in order to update the cached tree-type data structure.

The driver module and the hardware coprocessor can be an add-on for relational databases running on regular CPUs. The host CPU includes a database management system (DBMS) that implements functionality that can be considered state of the art in relational databases, such as, but not limited to structured query language (SQL) parsing, query planning, and data movement to and from the client.

The hardware coprocessor can act as an accelerator. There are multiple reasons for an accelerator to be used with a DBMS. Acceleration of tree traversal, index lookups, or on-the-fly data compression are some possibilities. Another is security. For example, Cipherbase is an enhanced version of an SQL server that integrates a hardware logic platform as a trusted computing module. Data can be encrypted by a cloud customer, uploaded into a server, and only then decrypted and processed within the FPGA to maintain confidentiality from hackers or for system administrators of the cloud service. The DBMS has the ability to store and manage data in encrypted form, then rely on the FPGA to carry out operations on these encrypted values. As a result, an index tree traversal in the database over encrypted values can rely on the FPGA for carrying out comparisons between a lookup key included in a query and contents of each tree node.

Example systems can implement a cache in the memory of the hardware coprocessor, which can be transparent for the DBMS at the host CPU and does not require modification to code of an associated database management engine. Furthermore, the hardware coprocessor can perform eager traversal on hardware cached portions of a tree-type data structure. The cached portions of a tree-type data structure are associated with a complete tree-type data structure that is stored relative to the DBMS. The eager traversal can be initiated upon the hardware coprocessor receiving a request for a key lookup in a root node from the driver module. The hardware coprocessor eagerly traverses (before the DBMS specifically requests) the cached tree, for as much of the tree that is cached. When these partial or complete results are returned to the driver, the driver can verify the consistency of these results with subsequent DMBS requests in constant time. Portions of the tree that are not cached can be transmitted and processed as before, with the hardware coprocessor transparently caching the new portions automatically.

Various examples, scenarios, and aspects are described further with reference to FIGS. 1-10.

Illustrative Environment

FIG. 1 illustrates an example environment for implementing a fast and secure system 100 for accessing data within a tree-type relational database data-structure(s). The example system 100 includes one or more database management system (DBMS) units 102(1)-(N) that are in signal communication with one or more user computing devices 104, such as a laptop computer 104(1), a smart phone 104(2), a personal data assistant (PDA) 104(3) or other computer device 104(N), via one or more networks 106. The DBMS units 102(1)-(N) can provide responses to queries provided by the user's computing device(s) 104(1)-(N). The responses to queries can include data included within one or more tree-type relational database data-structures stored locally with the DBMS units 102(1)-(N) or at some other data storage device(s) distributed across the networks 106.

In some examples, the DBMS units 102(1)-(N) can include components embodied in software and other components embodied primarily in hardware as part of a DBMS framework 108. Components embodied in software may include a DBMS 110 that can be in communication with a tree-type relational database data-structure stored within a data storage device 112 and a driver 116. The DBMS framework 108 may include components embodied in the hardware, such as a logic device 114. The logic device 114 can be considered a coprocessor to the DBMS 110. The DBMS 110 can receive queries from the user computing device(s) 104 or from some other source such as other software components that are requesting information stored in the tree-type relational database data-structure stored at the data storage device 112. The DBMS 110 can forward information associated with the queries to the logic device 114 via the driver 116. The logic device 114 can generate a response to the information received from the driver 116 and returns the response to the driver 116.

The DBMS 110 can include components for receiving queries from the user's computing devices 104. The DBMS 110, the driver 116 and the logic device 114 can be implemented on various/different devices distributed across the one or more networks 106. The network(s) 106 can include public networks, such as the Internet, private networks, such as an institutional and/or personal intranet, or some combination of private and public networks. The network(s) 106 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. The network(s) 106 can utilize communications protocols, including packet-based and/or datagram-based protocols such as Internet protocol (IP), transmission control protocol (TCP), user datagram protocol (UDP), or other types of protocols. Moreover, the network(s) 106 can also include a number of devices that facilitate network communications and/or form a hardware basis for the networks, such as switches, routers, gateways, access points, firewalls, base stations, repeaters, backbone devices, and the like.

In example scenarios, the DBMS unit(s) 102 can include one or more computing devices that operate in a cluster or other grouped configuration to share resources, balance load, increase performance, provide fail-over support or redundancy, or for other purposes. The DBMS unit(s) 102 can belong to a variety of categories or classes of devices such as traditional server-type devices, desktop computer-type devices, mobile-type devices, special-purpose-type devices, embedded-type devices, and/or wearable-type devices. Thus, although illustrated as desktop computers, the DBMS unit(s) 102 can include a diverse variety of device types and are not limited to a particular type of device. The DBMS unit(s) 102 can represent, but are not limited to, desktop computers, server computers, web-server computers, personal computers, mobile computers, laptop computers, tablet computers, wearable computers, implanted computing devices, telecommunication devices, automotive computers, network-enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

The DBMS unit(s) 102 can include any computing device having one or more processing unit(s) 118 operably connected to computer-readable media 120, such as via a bus 122, which in some instances can include one or more of a system bus, a data bus, an address bus, a PCI bus, a mini-PCI bus, and any variety of local, peripheral, and/or independent buses. The DBMS unit(s) 102 can include an input/output (I/O) interface 126 that can operably connect to the bus 122. Executable instructions stored on computer-readable media can include, for example, an operating system 122, a framework, and other modules, programs, or applications that are loadable and executable by the processing unit(s).

Figure 2:
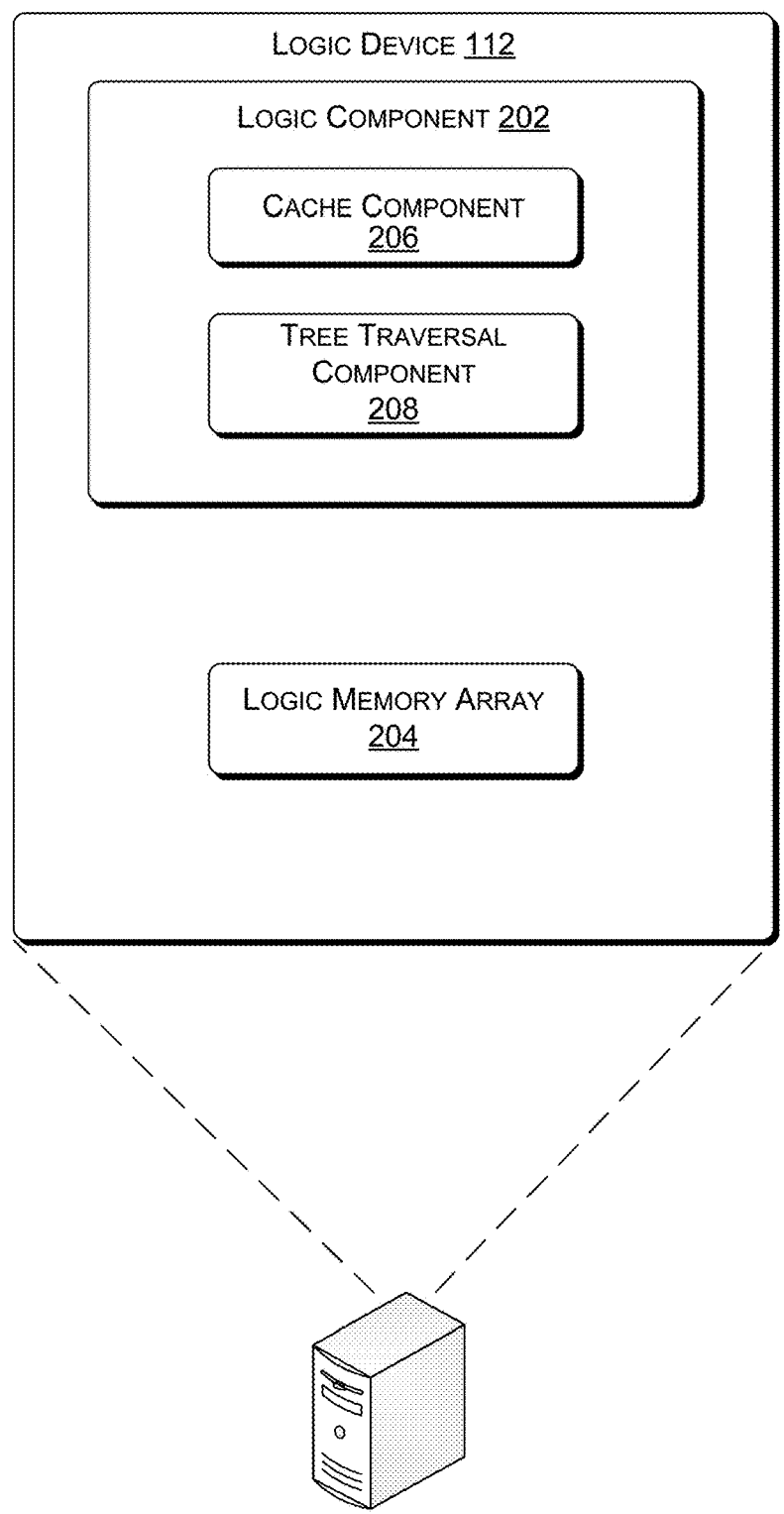
FIG. 2 is a block diagram depicting an example hardware logic device executing read/write operations in support of the database management system.

As shown in FIG. 2, in some examples, the logic device 114 can include one or more logic components 202 and a logic memory array 204. The logic memory array 204 could be separate from the logic device 114, such as a dynamic access memory (DRAM) or comparable memory device. The logic components 202 can include a cache component 206 and a tree-traversal component 208. The components 206 and 208 can communicate with the DBMS 110 and/or perform input/output (I/O) (e.g., read/write operations) with the logic array 204. The cache component 206 can allocate data associated with queries received from the DBMS 110 into memory locations within the logic array 204. The cache component 206 can allocate pages for nodes in order to produce at least a partial copy or an index of the tree-type relational database data-structure stored at the data storage device 112. The cache component 206 can allocate pages in a manner that allows stored nodes to be reused, thus making more efficient use of the logic array 204.

The tree-traversal component 208 can traverse the tree-type relational database data-structure stored in the logic array 204, based on query information received from the DBMS 110. The operations performed by the cache component 206 and the tree-traversal component 208 can be transparent to a core database management component located at the DBMS 110. These operations will be described in more detail below.

Alternatively, or in addition, the hardware logic device(s) 112 acts as an accelerator. For example, and without limitation, illustrative types of hardware logic devices that can be used include field-programmable gate arrays (FPGAs), application-specific integrated circuits (ASICs), application-specific standard products (ASSPs), system-on-a-chip systems (SOCs), complex programmable logic devices (CPLDs), etc. For example, an accelerator can represent a hybrid device, such as a CPLD from XILINX or ALTERA® that includes a CPU embedded in an FPGA fabric.

An FPGA can be an integrated circuit designed to be configured by a customer or a designer after manufacturing—hence "field-programmable". The FPGA configuration can be generally specified using a hardware description language (HDL), similar to that used for an application-specific integrated circuit (ASIC) (circuit diagrams were previously used to specify the configuration, as they were for ASICs, but this is increasingly rare).

Contemporary FPGAs have large resources of logic gates and RAM blocks to implement complex digital computations. FPGA designs employ very fast I/Os and bidirectional data buses. FPGAs can be used to implement any logical function that an ASIC could perform.

FPGAs contain programmable logic components called "logic blocks" and a hierarchy of reconfigurable interconnections that allow the blocks to be "wired together"—somewhat like many (changeable) logic gates that can be interwired in (many) different configurations. Logic blocks can be configured to perform complex combinational functions, or merely simple logic gates like AND and XOR. In most FPGAs, the logic blocks also include memory elements, which may be simple flip-flops or more complete blocks of memory.

Figures 1, 3:
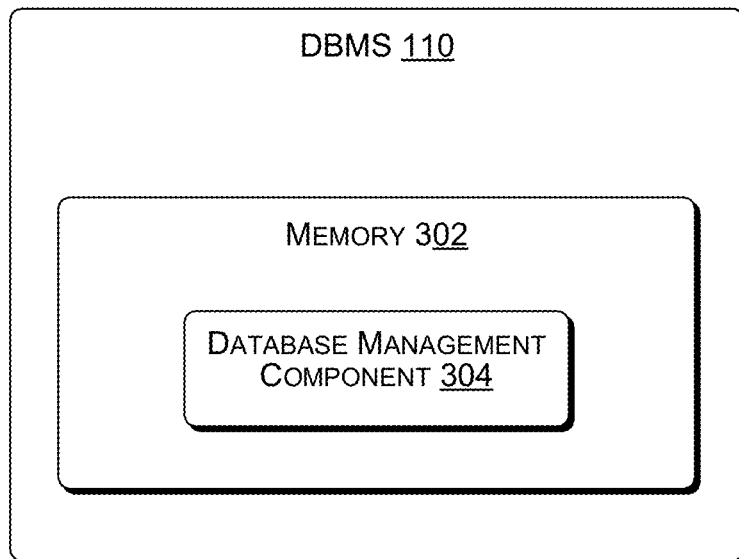
Figures 2, 3:
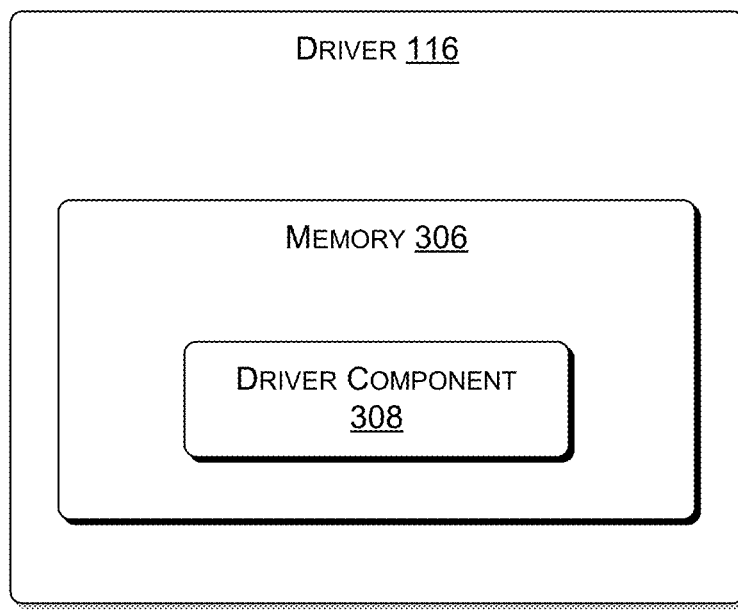

FIG. 3-1 illustrates example software components of the DBMS 110. The software components of the DBMS 110 can be stored as computer-readable media within a memory device 302. The software components can include at least a database management component 304. FIG. 3-2 illustrates example software components of the driver 116. The software components of the driver 116 can be stored as computer-readable media within a memory device 306. The software components can include at least a driver component 308. In some examples, the database management component 304 and the driver component 308 can interact with a coprocessor embodied as a hardware accelerator. The driver component 308 can provide an interface between the database management component 304 and the logic device 114. The driver component 308 can cause the operations performed by the cache component 206 and the tree-traversal component 208 to be transparent to the database management component 304. The driver component 308 also can perform verification of results received from the logic device 114. Operations of the driver component 308 will be described in more detail below.

In some examples, at the very start of execution, the logic device 114 can receive requests from the DBMS component 304 that can get passed through the driver component 308.

The request can include a search key and values stored in an index based on a tree-type data structure (i.e., a node-level request) of a tree-type relational data structure. Metadata, such as the child pointers, record IDs, etc. are not transmitted. The expected response from the hardware can be an index response including two numbers, representing the indexes of the first and last items in a value array for a node of a cached tree-type data structure that are equal to the search key (more accurately, the first value equal to or greater than the key and the first value strictly greater than the key). Other boundary variations may be used. The DBMS 110 can eventually initiate multiple requests to the logic device 114, traversing the cached tree-type data structure from node to node, based upon the indexes received from the hardware.

Each time the values for a node are received by the logic device 114, the cache component 206 can cache these values, if not already cached. Space for each node can be allocated on a page-by-page basis, where each tree node corresponds to one and only one memory page. Each page can be divided into two logical regions: one for the value array and the other for storing pointers to other pages in memory, thus building a tree structure. The divided two logical regions allow the values to be updated in place without touching their corresponding pointers. The memory allocation strategy can be as follows: pages are allocated sequentially in memory and only if the node that is to be stored in the cache doesn't already have a page. Because of the partitioned nature of pages, the pointers are never erased, so that, even if a node that used to have "children" becomes a "leaf", the underlying structure of the tree can be maintained for the future case of the nodes becoming a nonleaf again. This ensures that no allocated memory is ever lost.

Each node in the cached tree can be uniquely identified by its relative location to the root, expressed as a series of numbers representing the ordinal number of the pointer taken at each level in the tree leading up to the node. This series of numbers forms a unique path or path information from the root to any internal or leaf node and can be appended to incoming requests by the driver component 308. This path information can be derived in two ways. The first can be directly from the driver component 308. In the second way, the driver component 308 can communicate with the DMBS 110 to infer the path information, based upon knowledge of algorithm(s) used to traverse the associated (index) trees. That is, any incoming request can be identified as a follow-up to a previous request. This may be a new traversal request, in which case the request begins at the root of the tree or may be the traversal of an interior node based upon the prior result given by the logic device 114 (the pointer followed from each node is a direct result of the returned lower and upper bound indices).

The path information can be used by the logic device 114 for two purposes. First, the path information allows the logic device 114 to build a proper tree from the nodes received for key lookup processing. Second, the path information can enable independent traversal of the tree in the logic device 114.

The correct tree structure can be reconstructed in the logic device 114 in the following way. After the first node of an index is transmitted (i.e., the root), the DBMS unit 108 can transmit a "child" node from the second level in the tree. After the logic device 114 allocates a page for this node, the corresponding pointer in the parent can be updated to refer to this page. The path information that accompanies the second-level node can allow the logic device 114 to update the correct pointer. On the next operation, when the DBMS unit 108 can transmit the node on the third level, the logic device 114 will already have, in the cache, the previous two nodes and it inserts the new node as the correct child of the correct second-level node. That is, the logic device 114 can use the path information to traverse pages until the location of the current node is found. When the node sent from the DBMS unit 108 is a "leaf", a referencing pointer in the logic device 114 can be flagged to show that it points to a leaf. In case a node is located on a path that ends in an already allocated page, the contents of the page can be directly updated with the new node, therefore, no additional memory has to be allocated. The traversal of the tree path for allocation purposes does not require the logic device 114 to read full pages; the logic device 114 needs to retrieve only one pointer per page. The location of the pointers can be fixed in pages and the ordinal number, provided as part of the path information, gives the exact memory location of the pointer. Thus, these pointers can be found by random access of algebraically calculated memory locations.

In an alternative memory allocation strategy two page sizes are used. Large pages can be allocated with enough space to store values and pointers, while small pages can have space for only the values. Leaf nodes can be stored without wasting space for pointers. This does complicate the memory allocation process a little bit. In case a node that previously was a "leaf" becomes an internal node, the page will be too small to store both the values and the pointers. So a new large page can be allocated for this node and the pointer in the parent of the small page can be updated to point to the newly allocated large page. In order not to lose the already allocated small page, the newly allocated large page's first child pointer can be set to reference it. This way it will be eventually used for storing a leaf node and no memory is ever lost.

The second way the logic device 114 (i.e., the tree-traversal component 208) uses the path information to navigate the tree on its own. An eager traversal can be initiated when the logic device 114 receives a request to look up a key in the root node. It will not only perform this key search, but will also descend the cached tree as far as possible, generating the results for future requests on the same key. To navigate the cached tree, the tree-traversal component 208 can use bound indexes at each node and the pointers in the pages: after determining the position of a key in a node, the tree-traversal component 208 can retrieve its child node at the lower bound tree-traversal component 208 (based on the pointer), bring its page into temporary storage, and perform a key lookup on it. Once it finds the boundaries in this node, it can output this information, and continue deeper, until an unallocated pointer is encountered, or a leaf node is reached.

In some examples, the pointers can carry additional metadata to stop eager traversal when it is known that the results would be incorrect/not useful for the DBMS unit 108 for example, when a node migrates from being an internal node to being a leaf in the tree. Because the leaf node was an internal node, its page in the cache will have an array of pointers (pointed to allocated space or possibly null). If these pointers were to be followed, the results would, by definition, be incorrect because no child nodes exist. To avoid this problem, the pointers can carry some metadata, such as the length of the array in the page pointed to and/or whether the child node is a leaf or not. This way, even if the tree-type data structure was previously allocated to be deeper than the current one in the data storage device 112, after updating a node to be a leaf, its pointer in its parent node can have its leaf-flag activated. The pointers in the current leaf are not deleted so that if/when the node becomes an internal node again, the space already allocated for its "children" can be used again. In other words, the physical structure of the tree in the cache, and the logical structure of the data in it may be different—which, in turn, may be different in content from the version of the nodes in the data storage device 112.

The eager traversal can communicate partial results to the driver component 308 and in such a way that the correctness of these results can be verified in constant time. The tree-type structure in the cache can be significantly different from the one maintained by the DBMS unit 108. Due to the transparent and loosely coupled nature of the cache, the DBMS unit 108 can have inserted, deleted, or otherwise changed the contents of the index without updating the logic device 114. Thus, the results of eager traversal may be incorrect (or at least inconsistent with) the current version of the tree.

After finishing an eager traversal, assuming the data in the tree is organized in a sorted manner, the logic device 114 can return the following information to the driver component 308, in addition to the result of the original request (root node): for each node traversed it will return two indices in the array (to mark the range in the array equal to the key) and four actual values from the array. These values are the two values at the actual indexes, the value immediately before the first value (if one exists), and the value immediately following the last value (if one exists). These six values are sufficient for the driver component 308 to determine if the answer provided by the logic device 114 for a given node is correct for the current state of that node. If the returned values are identical to the values in the same locations in the tree-type data structure associated with the DBMS unit 108, no item equal to the key could have been inserted either before or after the range that was returned by the logic device 114. Thus, a partial result can be safely accepted even if parts of the node have been updated in the meantime (i.e., the version in the cache is actually out of date). In that case, the changes simply need to be in portions of the data that are not pertinent to the search key.

The driver component 308 can store the responses from the logic device 114 in a lookup table (LUT), labeled with the path information of the node and the search key. When a request arrives from the database management component 304, the driver component 308 can first verify whether it already has a pregenerated response for the request in the LUT. If the LUT has a response stored, the driver component 308 can determine whether or not this response is correct (i.e., does not conflict with the DBMS unit's version of the data). If the response is correct, the database management unit 304 will receive this response without going to the logic device 114. Otherwise, the driver component 308 will relay the request to the logic device 114, which will then perform the lookup on the updated node. As part of this operation, the logic device 114 will implicitly cache the node (with the help of the path information).

Eager traversals can be initiated for requests to the root node, so a mismatch down the path won't trigger further work on the logic device 114 for that path. Also, if the working set of the index is very large or if the driver wants to manually offer hints to the logic device 114 as to which nodes to cache (e.g., only the uppermost levels of the tree), the logic device 114 does not necessarily have to cache the new node.

Using eager traversal in the logic device 114 not only reduces the expected number of communications between the logic device 114 and the DBMS unit 108, it can also reduce the total amount of data sent between the two.

Illustrative Processes

The processes 500-700 are illustrated as a collection of blocks in logical flow graphs, which represent a sequence of operations that may be implemented in hardware, software, or a combination thereof. In the context of software, the blocks represent computer-executable instructions stored on one or more computer-readable storage media that, when executed by one or more processors, perform the recited operations. Computer-executable instructions may include routines, programs, objects, components, data structures, and the like that perform particular functions or implement particular abstract types of data. The order in which the operations are described is not intended to be construed as a limitation, and any number of the described blocks may be combined in any order and/or in parallel to implement the illustrated process. One or more of the processes described herein may occur independently or in relation in any order, whether in series or parallel.

Figure 4:
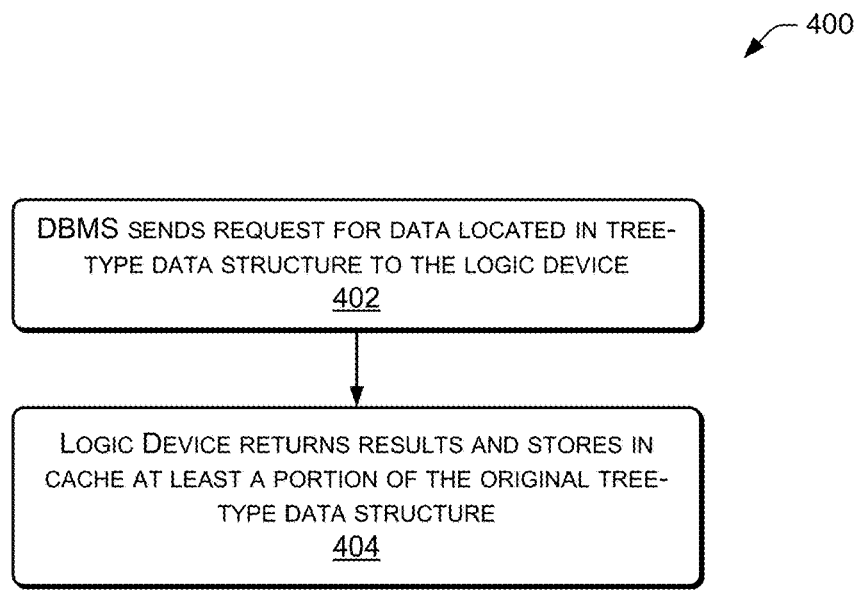
FIG. 4 is a flow diagram depicting an example operation of software and hardware components of the database management system.

FIG. 4 illustrates a high-level process 400 performed by a system similar to the system 100 of FIG. 1. First, at a block 402, a DBMS (i.e., a software untrusted machine, such as the database management component 304) can send to a logic device (e.g., a hardware-trusted machine, processing element, such as the logic device 114) a request for data or a data index associated with the tree-type relational database data-structure. The request sent by the DBMS is described in more detail below with regard to FIG. 5-1. At a block 404, in response to receiving the request, the logic device can return results and stores in a hardware cache at least a portion of the original tree-type data structure that can be stored in its entirety at a data storage device associated with the DBMS. Details of the process performed at blocks 402 and 404 are described below in more detail with regard to FIGS. 5-1, 5-2, 6, 7-1, and 7-2.

Figures 1, 5:
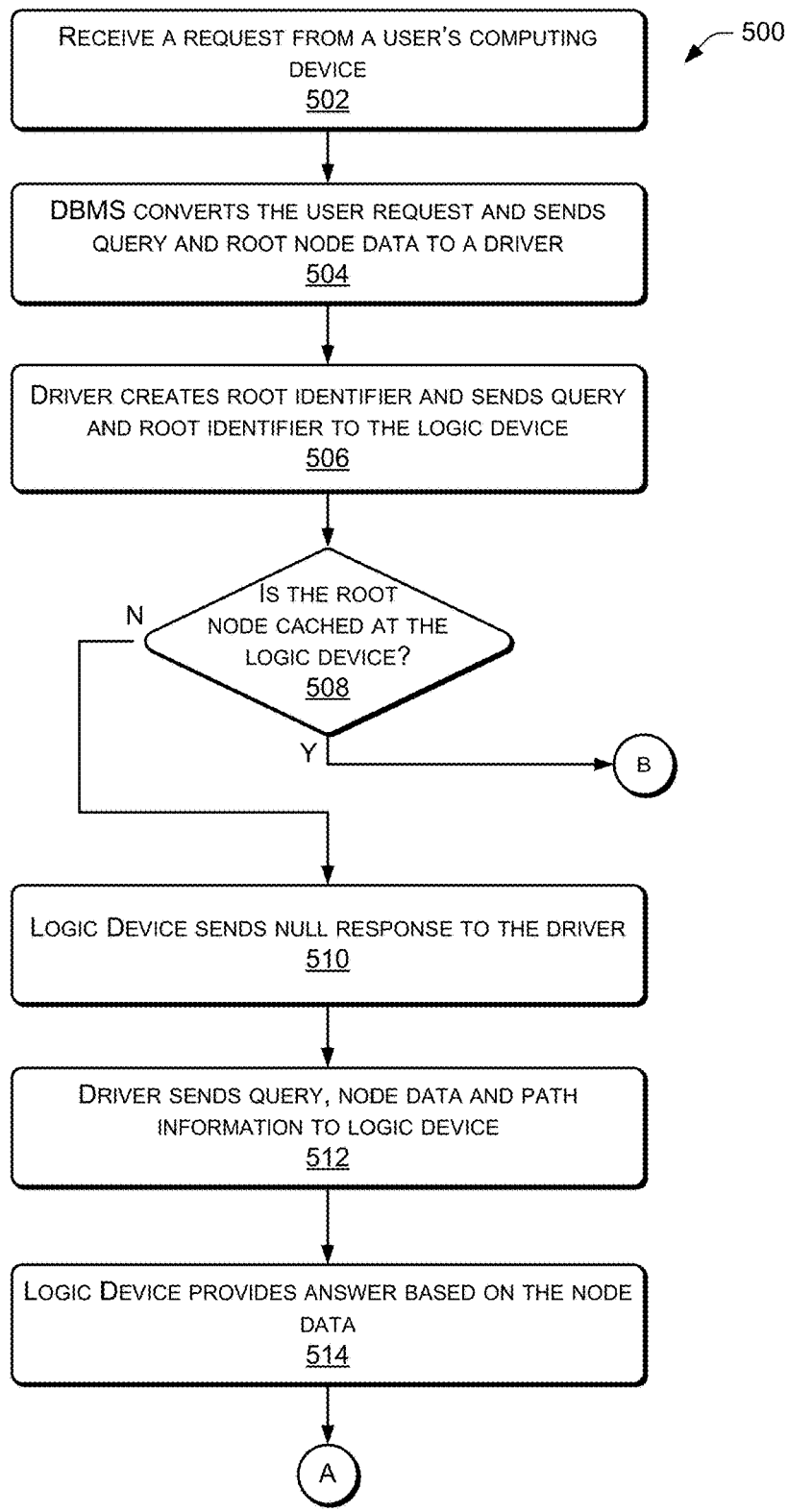
Figures 2, 5:
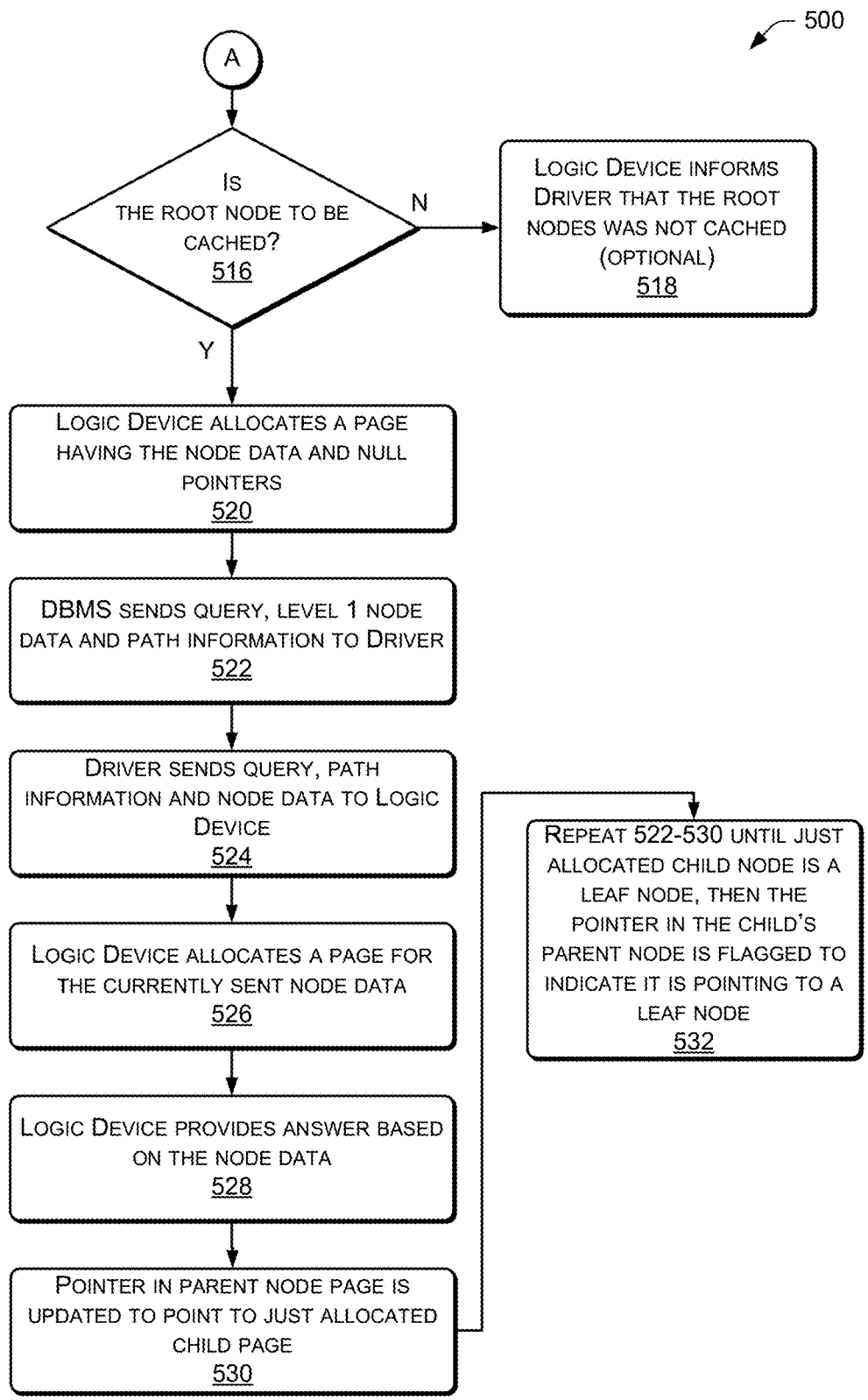
Figure 6:
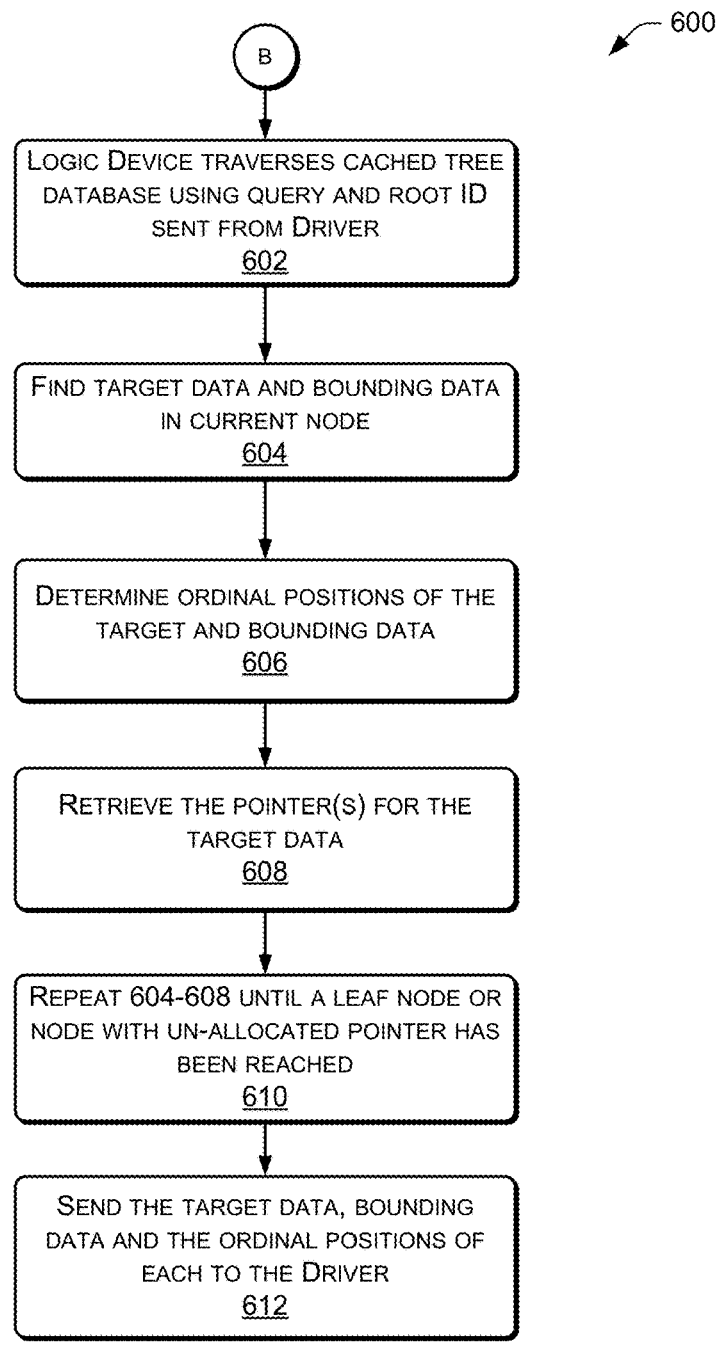
FIG. 6 is a flow diagram showing an example approach for performing traversal of a tree-type data structure cached at a hardware logic device.

FIGS. 5-1 and 5-2 illustrate a process 500 for sending queries from the DBMS to the logic device and allocating memory that occurs at the cache associated with the logic device. First, at block 502, a database management component can receive a request from a user's computing device (e.g., the user's computing device 104). At block 504, the DBMS can convert the user request into a query with root node data that can be sent to a driver component (e.g., the driver component 308). The driver component can be executable by the same processing device that executes the DBMS or may be executable by a different logic device.

At block 506, the driver can create a root identifier that can be based on the root node data, then the driver can send the received query and the root identifier to a logic device. The root identifier is part of path information. The path information is sent with every request to the logic device. The path information can be created by the DBMS or inferred by the driver.

At decision block 508, the logic device determines whether the root node associated with the received root identifier is already cached at the logic device.

At block 510, if the root node is not cached at the logic device, the logic device can send a null response to the driver. The response can be a null response because the root node has not been cached.

At block 512, in response to receiving the null response from the logic device, the driver can resend the query along with actual node data and path information to the logic device. At block 514, the logic device can provide an answer, based on the newly sent data rather than any previously cached data.

At decision block 516, the logic device can determine whether the root node data is to be cached. Many factors may be used to decide whether the root node data is to be cached. For example, there can be a determination at the logic device that the root node associated with a query is such an infrequently accessed node, that the logic device can decide not to waste cache space for this node.

At a block 518, the logic device can inform the driver that the root node was not cached, if it was determined that the root node was not to be cached. Informing the driver that the root node was not cached may be optional because there may not be a need for providing this information to the driver other than to allow the driver to send only the node data the next time that the same query is provided.

If it is determined, at decision block 516, that the root node is to be cached, then, at block 520, the logic device can allocate a page for storing the received node data and a set of null pointers. Caching a node at the logic device includes allocating a page within a storage array (i.e., cache) of the logic device. The page can include two logically separated sections that each have a preset size. One section can be for storing data values of the node. The other section can be for storing pointers for the stored data values.

At block 522, the DBMS can send a query, tree level-I node data and optionally path information to the driver. The path information can be inferred by the driver, because the driver knows 1) what tree root it had previously received from the DBMS and 2) which ordinal within the root that the logic device said matched the search key. At block 524, the driver can send the query, the path information and the received level-I node data to the logic device. At block 526, the logic device can allocate a page for the level-I nodes data. This allocation can be similar to the root node allocation. Because pages are allocated sequentially and because once written, the pointers inside a page hardly ever change (and if they do need to change, new pointers are added in their place and the old pointers are preserved by writing them into another page), this allocation can allow reuse of pages if the associated node needs updating or needs reactivation if the parent node had previously removed a pointer to the node.

At block 528, the logic device can provide an answer, based on the received node data and/or the path information. At a block 530, a pointer in the parent node page can be updated to point to the just allocated child page.

Then, at block 532 blocks 522-530 are repeated until the just allocated node is a leaf node, then the pointer in the parent node can be flagged to identify the child node as a leaf node.

If, at decision block 508, the root node is already cached at the logic device, then the process 600 can execute. At block 602, the logic device can traverse the cached tree data structure using the query and root ID sent from the driver. At block 604, the logic device can find target data associated with the query and boundary data in the currently accessed node of the tree. At a block 606, the logic device can determine the ordinal positions of the found target and boundary data. The target data, boundary data and the ordinal position information can be temporarily saved. At a block 608, the logic device retrieves the pointer(s) for the target data. The data at this pointer will become the new "current node". At a block 610, blocks 604-608 can be repeated until a leaf node or a node with an unallocated pointer has been reached. After a leaf node or a node with an unallocated pointer has been reached, then at a block 612 the logic device can send the target data, the boundary data and the ordinal position information to the driver.

Figures 1, 7:
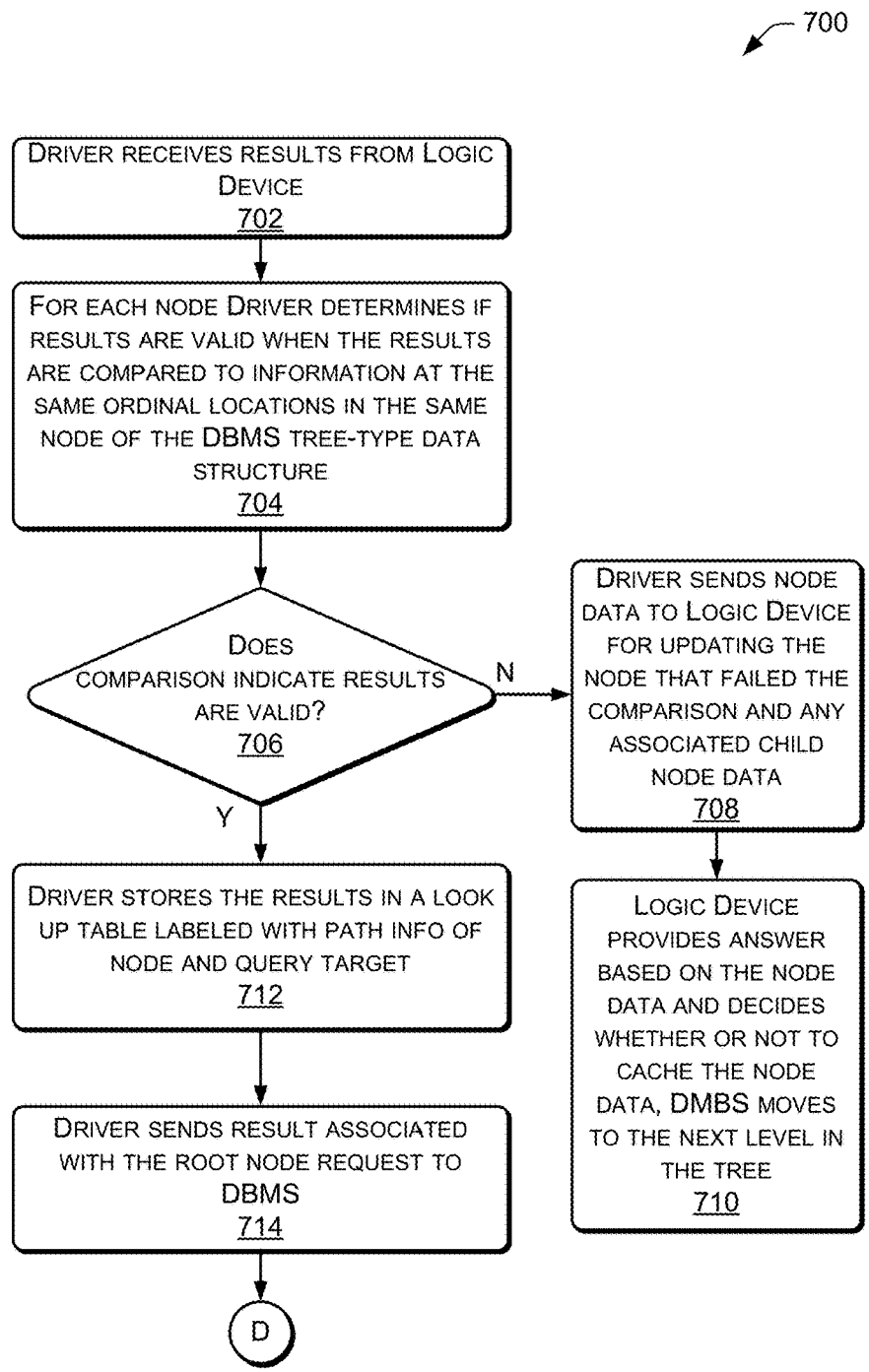
Figures 2, 7:
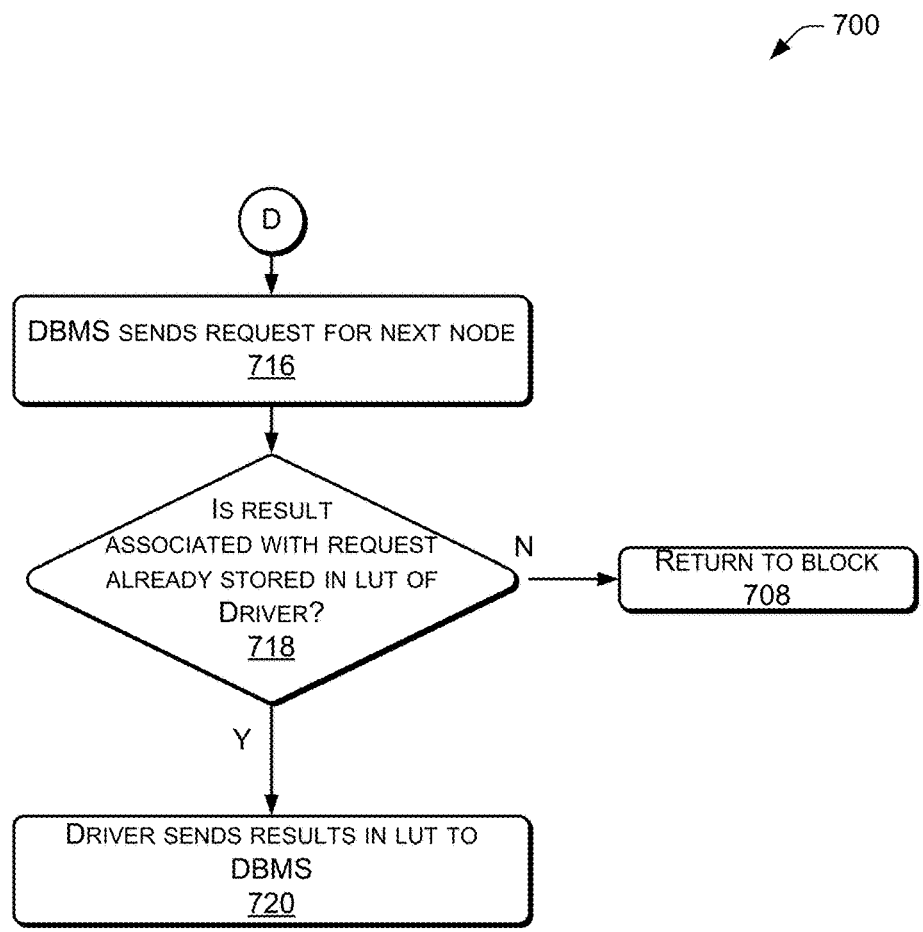

FIGS. 7-1 and 7-2 illustrate the process 700 performed by the driver. At a block 702, the driver can receive the results from the logic device. At a block 704, for each information associated with the node that the driver receives from the logic device, the driver can determine whether the results are valid, when they are compared to information stored at the same ordinal locations in the same node of the tree data structure that is associated with the DBMS. The driver can directly look up and compare the two target data and two boundary data values received from the logic device to those in the node provided by the DBMS in constant time (using the ordinal information). At a decision block 706, the driver can determine whether the comparison produced is a valid result or an invalid result. If the comparison determined that the results were invalid, in other words, the data at the same ordinal positions within the node provided by the DBMS did not compare favorably to those cached by the logic device, then, at a block 708, the driver can send the query, node data and path information to the logic device for updating the node that fails the comparison test and any associated child node data. This occurs because, if a node fails the comparison, then all children of that node will also be inconsistent. Next, at a block 710, the logic device can provide and answer based on the node data and can decide whether or not to cache the node data, then the DMBS moves to the next level in the tree.

If, at the decision block 706, the comparison results indicated that the node data were valid then, at a block 712, the driver can store the results in a lookup table (LUT) labeled with the path information associated with the stored node and the associated query target. Next, at a block 714, the driver can send results associated with the root node request to the DBMS. At a block 716, the DBMS sends a request for the node in the next level of the tree to the driver. At a decision block 718, the driver can determine if the results associated with the request for the next node are already stored in the LUT of the driver. If the results are not stored in the LUT of the driver, the process can return to block 708. However, if the results associated with the request are already stored in the LUT of the driver, then, at a block 720, the driver can send results stored in the LUT to the DBMS. This process will continue, by returning to block 716, until the DBMS obtains the results for a leaf node or until it has traversed deep enough in the tree to obtain the necessary information for processing the client query.

Figures 1, 8:
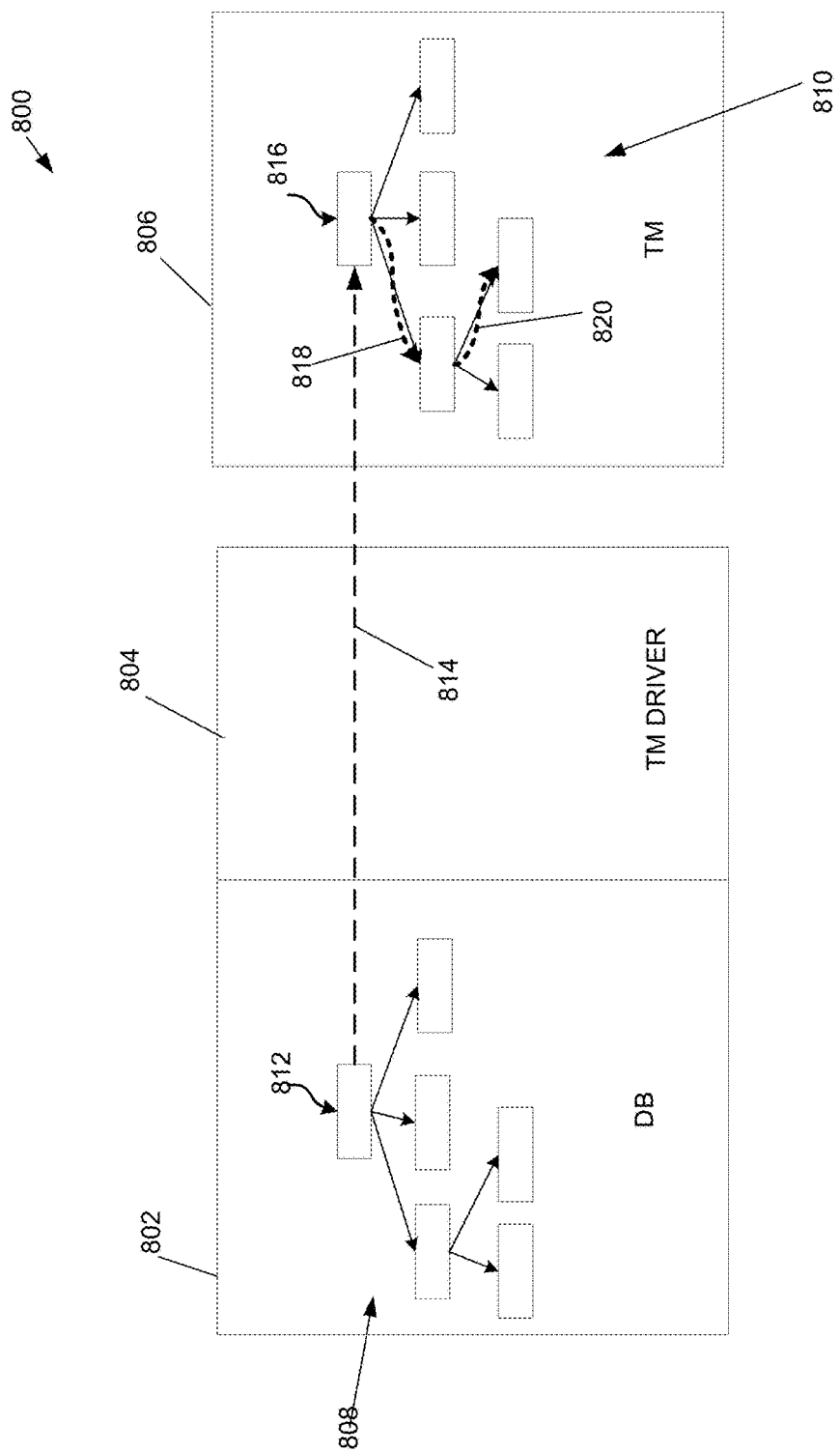
Figures 2, 8:
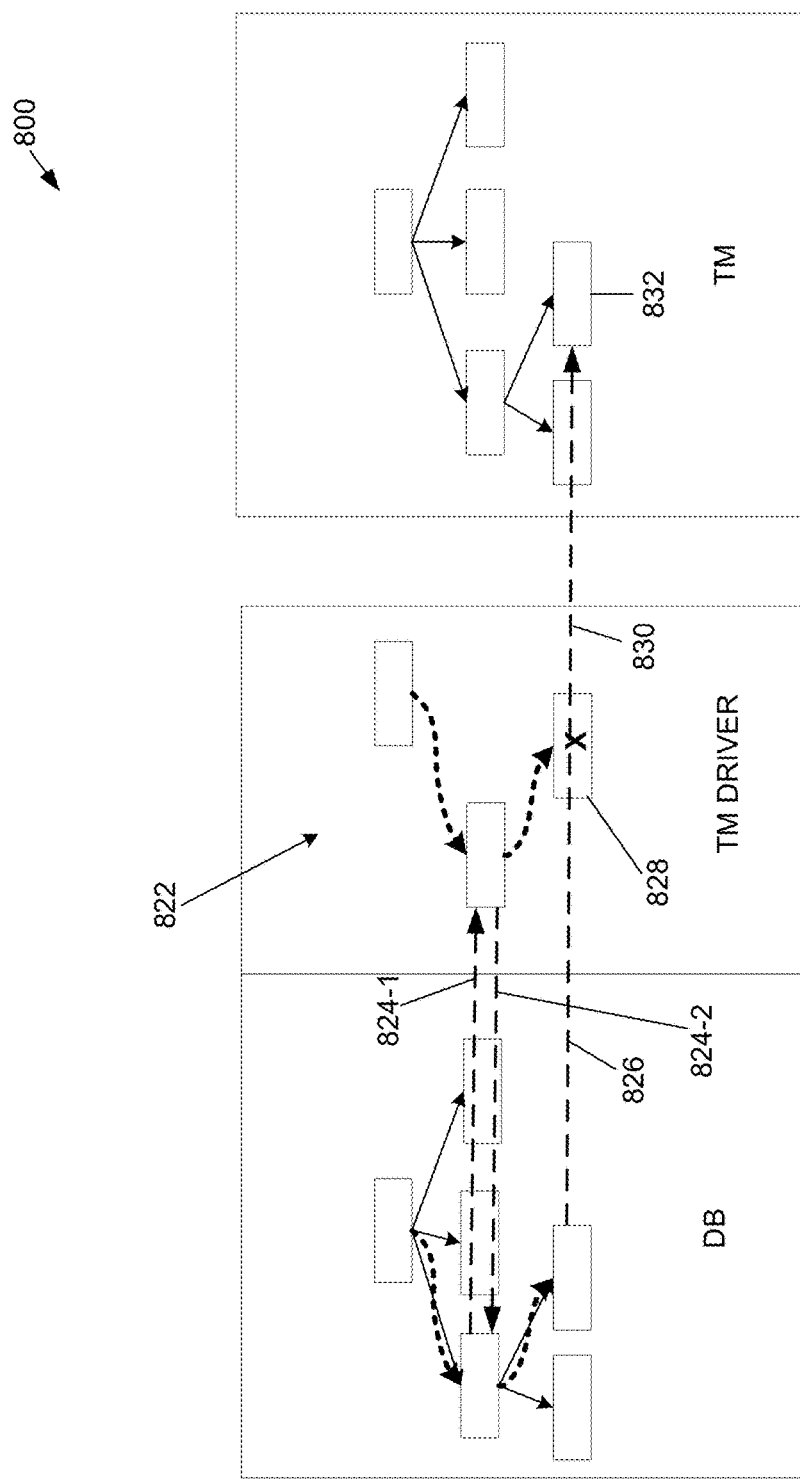

FIGS. 8-1 and 8-2 graphically illustrate the communication that occurs within a system 800 that includes software components (a DBMS 802 and a driver 804) and hardware components (a logic device 806). Shown at the DBMS 802 is a tree-type data structure 808. The DBMS 802 has received a query from an outside source for information that can be stored ultimately at a leaf node of the tree-type data structure 808. In response to the received query, the DBMS 802 can send a node-level query for a root node 812 of the tree-type data structure 808 to the driver 804. If the driver 804 does not have results associated with the provided search key and root node 812 stored in a LUT, the driver 804 at arrow 814 can forward the query and a root node ID to the logic device 806. The logic device 806 then can perform an eager traversal of a tree-type data structure 810 that has been previously stored in a cache memory associated with the logic device 806. The logic device 806 starts at a root node 816 of the tree-type data structure 810 traverse to a level-I node (arrow 818) to a root node of level-II (arrow 820).

After the logic device 806 has traversed as far as it can go within the tree-type data structure 810, whether that is to a leaf node or a node with a null pointer, the logic device 806 can send target and boundary information 822 associated with the nodes traversed to the driver 804. The driver 804 can store the information 822 received from the logic device 806 into an LUT. After a request (e.g., arrows 824-1 and 826) from the DBMS, the driver 804 then can send the information (e.g., arrow 824-2) stored in the LUT only if the received information passes a validity check. If the received information does not pass a validity check, such as shown by an "X" at the index information associated with the tree's level-II node 826, then the driver can forward the original query, node data information, and path information to the logic device 806 (arrow 830). The logic device 806 can then provide a new answer based on the updated values and then store or update the values in its associated cache for the level-II node 832.

Figure 9:
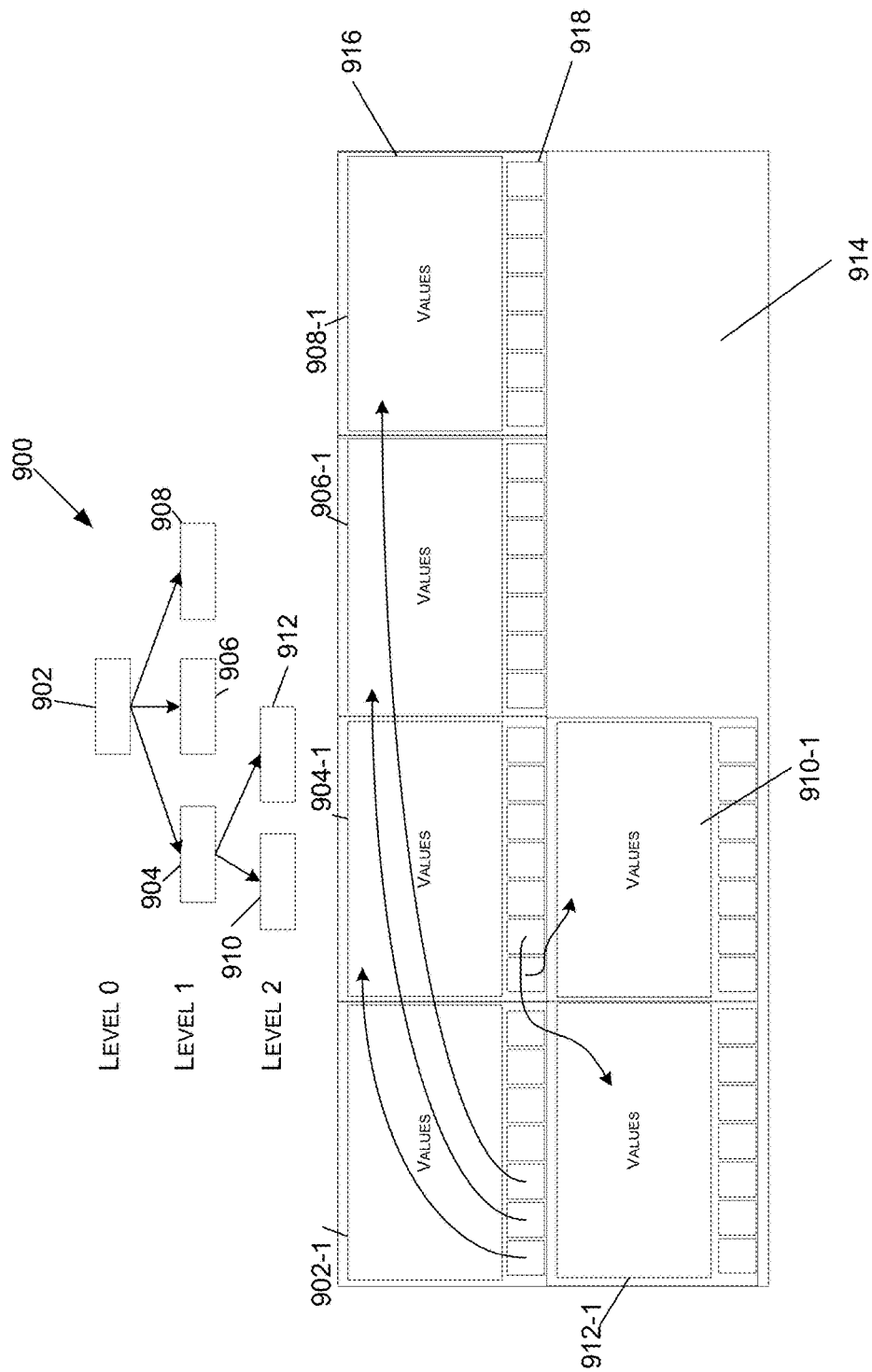
FIG. 9 graphically illustrates memory allocation that occurs at the logic device.

FIG. 9 illustrates how node pages are allocated by a logic device to a cache tree-type data structure 900. The cache tree-type data structure 900 includes a root node 902 at a level-0, three nodes 904, 906, and 908 at a level-I and two nodes 910 and 912 at level-II.

When information of root node 902 is received at the logic device, a first page 902-1 can be allocated at a first location within cache memory 914. Pages can be allocated within the cache memory 914, based on the order in which a query for the associated node is received by the logic device. Pages include a value section 916 and a pointers section 918. In the example shown, the order in which the node queries are received is as follows: root node 902 is followed by tree level-I first node 904, tree level-I second node 906, tree level-I third node 908, tree level-II second node 912, and finally tree level-II first node 910. Thus, the order of the pages allocated within the cache memory 914 mirror the arrival order of the node queries. As associated with their like numbered nodes, this is page 902-1, page 904-1, page 906-1, page 908-1, page 912-1, page 910-1. Notice that the logic device allocates tree node pages as they are queried upon by the driver and may or may not cache tree node pages when computation upon them is requested. Furthermore, the logic device can only cache those pages that are queried upon. Thus, the physical layout of the tree in memory and the contents of the tree may be significantly different from the tree stored in the DBMS.

In some examples, skew in the workload can provide some benefits. First, if groups of keys that are near each other in the tree are accessed (i.e., they have common partial paths), they can benefit from each other's updates. For example, the cost of updating all of the nodes along the full path from root to leaf for one key can be amortized among all other keys that share those portions of their path. That is, any other keys contained in the updated nodes can be updated (and thus can potentially benefit from eager traversal), even if they have never been looked up before.

The other case in which skew can be beneficial for cache performance is when updates occur for the tree, but the most frequently accessed keys are not modified. Here, although the data in the cache is outdated, this staleness can be tolerated due to the ordinal and data plus boundary value result checking. That is, even if a node has been updated in the database, as long as the specific keys relevant for a given (frequent) query have not been touched, the logic device can provide a correct result.

The final way that skew can be exploited is that, because tree node pages are cached only when they are accessed as part of a query, a skewed workload can place only a portion of the overall tree in the cache.

Figure 10:
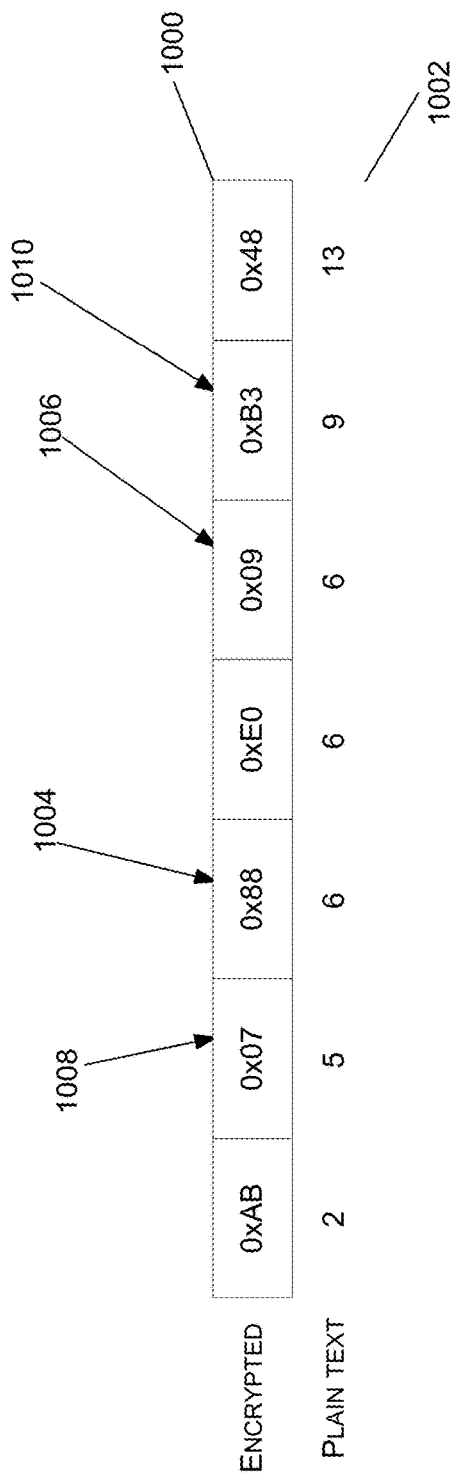
FIG. 10 shows an example result produced by the logic device.

FIG. 10 illustrates a partial string of encrypted data 1000 and its corresponding plaintext values 1002. If the original query generated by a user computing device had a plaintext value of 6, then the user's computing device would have encrypted the original query and sent it to a DBMS for processing. In some examples, decryption occurs at a hardware logic device for performing processing functions for the DBMS. Therefore, because the logic device is a hardware device, the security of the information stored in a tree-type data structure can be ensured. The DBMS can include a tree-type data structure of encrypted values but not of plaintext values. The hardware logic device can be capable of caching at least a portion of the encrypted tree-type data structure but then would be able to decrypt specific requested information related to that data structure. Therefore, in this example, the hardware logic device can return the ordinal values 2, 4 representing the left and right boundaries 1004, 1006 of encrypted data associated with the plaintext value included in the original query. In order for the encrypted data to be validated, the hardware logic device also can send encrypted values at 1004, 1006 and those at 1008, 1010 located adjacent to the encrypted data associated with the plaintext value included in the original query.

Example Clauses

A: A method comprising: at a database management system (DBMS) at least partially embodied in computer-readable media executable by one or more processors, in response to receiving the query, sending a query to a driver; and at the driver at least partially embodied in computer-readable media executable by one or more processors, in response to receiving the query from the DBMS, sending a modified query to a hardware logic device.

B: The method as paragraph A recites, further comprising: at the hardware logic device, in response to receiving the modified query, traversing nodes of a tree-type relational database data-structure previously cached in memory associated with the hardware logic device based at least on the modified query; retrieving at least portions of data located at each traversed node; and sending the retrieved portions of data to the driver.

C: The method as paragraphs A or B recite, further comprising: at the driver, in response to receiving portions of data from the hardware logic device, validating the portions of the data based at least on associated data stored at one of the one or more tree-type relational database data-structures associated with the DBMS; and in response to validating the portions of the data, sending the validated portions of the data to the DBMS.

D: The method as paragraphs A, B, or C recite, wherein the query is a node-level query comprising at least a query value and data located at an associated node, wherein the modified query is a tree-level request comprising the query value and a node identifier.

E: The method as paragraphs A, B, C, or D recite, further comprising: at the driver, in response to receiving portions of data from the hardware logic device, determining whether the received portions of the data are inconsistent; and in response to determining that the received portions are inconsistent, sending the query, node data and path information to the hardware logic device; and at the hardware logic device, in response to receiving the query, the node data and the path information, performing at least one of: allocating a page for a node associated with the node data; or updating at least one of data values or pointer information included in a previously cached page associated with the node data.

F: The method paragraphs A, B, C, D, or E recite, further comprising: at the hardware logic device, in response to receiving the query, node data and path information, sequentially allocating a page within a cache memory associated with the hardware logic device for a node associated with the received query, the node data and the path information being based at least on allocation rules when the cache memory does not currently include a page associated with the node that is associated with the received query.

G: The method paragraphs A, B, C, D, E, or F recite, further comprising: at the driver, attempting to validate portions of data sent from the hardware logic device; in response to not being able to validate the portions of data, sending the query, node data, and path information to the hardware logic device; and at the hardware logic device, in response to receiving the query, the node data, and the path information, updating at least one of the data values or pointer information included in the previously cached page associated with at least one of the received node data or the received path information.

H: The method paragraphs A, B, C, D, E, F, or G recite, further comprising: at the driver, storing the portions of data received from the hardware logic device within a lookup table (LUT); in response to receiving the query from the DBMS, determining whether information stored within the LUT is associated with the received query; and sending information stored within the LUT to the DBMS based on a determination that the information stored within the LUT is associated with the received query.

I: The method paragraphs A, B, C, D, E, F, G, or H recite, further comprising: at the hardware logic device, in response to receiving the modified query, traversing nodes of a tree-type relational database data-structure previously cached in memory associated with the hardware logic device based at least on the modified query; retrieving at least portions of data located at each traversed node; and sending the retrieved portions of data to the driver, wherein the retrieved portions of data located at a traversed node comprise at least one of a first data value associated with a node identifier and the data value's ordinal position of the first data value within an associated cached page and at least one second data value located at a predefined location relative to the first data value and the second data value's ordinal position within the cached page.

J: The method paragraphs A, B, C, D, E, F, G, or I recite, further comprising: at the hardware logic device, in response to receiving the modified query, traversing nodes of a tree-type relational database data-structure previously cached in memory associated with the hardware logic device based at least on the modified query; retrieving at least portions of data located at each traversed node; and sending the retrieved portions of data to the driver, wherein the retrieved portions of data located at a traversed node comprise at least one of a first data value associated with a node identifier and the data value's ordinal position of the first data value within an associated cached page and at least one second data value located at a predefined location relative to the first data value and the second data value's ordinal position within the cached page, wherein the first data value comprises lower and upper bounded values associated with the node identifier, wherein the second value comprises a value located at an ordinal position that is at least one less than the lower bounded value and a value located at an ordinal position that is at least one greater than the upper bounded value.

K: The method as paragraphs A-J recite, wherein the page comprises a value location and a pointer location, the pointer location being logically separated from the value location.

L. A device for performing the method described in any of paragraphs A-K.

M. A system comprising: a database management system (DBMS) at least partially embodied in a computer-readable media executable by one or more processors, wherein the DBMS, in response to receiving a query, sends a query; and a driver at least partially embodied in a computer-readable media executable by one or more processors, wherein the driver, in response to receiving the query from the DBMS, sends a modified query to a logic device.

N. The system paragraph M recites, further comprising: a logic device, at least partially embodied in hardware, comprises cache memory for storing a tree-type relational database data-structure associated with at least a portion of one of the one or more tree-type relational database data-structures associated with the DBMS, the logic device, in response to receiving the modified query, traverses nodes of the tree-type relational database data-structure stored in the cache memory based at least on the modified query; retrieves portions of data located at each traversed node; and sends the retrieved portions of data to the driver.

O. The system paragraphs M or N recite, wherein the driver, in response to receiving the portions of data, validates the portions of the data, based at least on data stored at one of the tree-type relational database data-structures associated with the DBMS; and sends the validated portions of the data to the DBMS.

P. The system paragraphs M, N, or O recite, wherein the query is a node-level query comprising at least a query value and data located at an associated node, wherein the modified query is a tree-level request comprising the query value and a node identifier.

Q. The system paragraphs M, N, O, or P recite, wherein the driver, in response to receiving portions of data from the logic device, determines whether the received portions of the data are inconsistent; and in response to determining that the received portions of the data are inconsistent, sends the query, node data and path information to the logic device, and wherein the logic device, in response to receiving the query, the node data, and the path information, performs at least one of: allocating a page for a node associated with the node data; or updating at least one of data values or pointer information included in a previously cached page associated with the node data.

R. The system paragraphs M, N, O, P, or Q recite, wherein the logic device, in response to receiving the query, node data and path information, sequentially allocates a page within a cache memory associated with the logic device for a node associated with the received query, the node data and the path information being based at least on allocation rules when the cache memory does not currently include a page associated with the node that is associated with the received query.

S. The system paragraphs M, N, O, P, Q, or S recite, wherein the driver, attempts to validate portions of data sent from the logic device; and in response to not being able to validate the portions of data, sends the query, node data and path information to the logic device, wherein the logic device, in response to receiving the query, the node data, updates at least one of the data values or pointer information included in the previously cached page associated with at least one of the received node data or the received path information.

T. The system paragraphs M, N, O, P, Q, R, or S recite, wherein the driver, stores portions of data received from the logic device as nodes within a lookup table (LUT); in response to receiving the query from the DBMS, determines whether information stored within the LUT is associated with the received query; and sends information stored within the LUT to the DBMS based at least on a determination that the information stored within the LUT is associated with the received query.

U. The system paragraphs M, N, O, P, Q, R, S, or T recite, wherein the logic device, in response to receiving the modified query, traverses nodes of a tree-type relational database data-structure previously cached in memory associated with the logic device based at least on the modified query; retrieves at least portions of data located at each traversed node; and sends the retrieved portions of data to the driver, wherein the retrieved portions of data located at a traversed node comprise at least one of a first data value associated with a node identifier and an ordinal position of the first data value within an associated cached page and at least one second data value located at a predefined location relative to the first data value and an ordinal position of the second data value within the cached node.

V. The system paragraphs M, N, O, P, Q, R, S, or T recite, wherein the logic device, in response to receiving the modified query, traverses nodes of a tree-type relational database data-structure previously cached in memory associated with the logic device based at least on the modified query; retrieves at least portions of data located at each traversed node; and sends the retrieved portions of data to the driver, wherein the first data value comprises lower and upper bounded values associated with the node identifier and wherein the second value comprises a value located at an ordinal position that is at least one less than the lower bounded value, when the lower bounded value is not the first value in the page and a value located at an ordinal position that is at least one greater than the upper bounded value, when the upper bounded value is not the last value in the page.

W: The method as paragraphs M, N, O, P, Q, R, S, T, U, or V recite, wherein the page comprises a value location and a pointer location, the pointer location being logically separated from the value location.

X: A system comprising: at a database management system (DBMS) means at least partially embodied in computer-readable media executable by one or more processors for sending a query, in response to receiving the query; and a driver means at least partially embodied in computer-readable media executable by one or more processors for sending a modified query, in response to receiving the query from the DBMS.

Y: The system as paragraph X recites, further comprising a logic means for traversing nodes of a tree-type relational database data-structure previously cached in memory associated with the logic means based at least on the modified query, in response to receiving the modified query; retrieving at least portions of data located at each traversed node; and sending the retrieved portions of data to the driver means.

Z: The system as paragraphs X or Y recite, further comprising a hardware driver means, in response to receiving portions of data from the logic means, validates the portions of the data based at least on associated data stored at one of the one or more tree-type relational database data-structures associated with the DBMS means; and in response to validating the portions of the data, sends the validated portions of the data to the DBMS means.

AA: The system as paragraphs X, Y, or Z recite, wherein the query is a node-level query comprising at least a query value and data located at an associated node, wherein the modified query is a tree-level request comprising the query value and a node identifier.

BB: The system as paragraphs X, Y, Z, or AA recite, wherein the driver means, in response to receiving portions of data, determines whether the received portions of the data are inconsistent; and in response to determining that the received portions are inconsistent, sending the query, node data and path information; and further comprising a logic means, in response to receiving the query, the node data and the path information, performing at least one of: allocating a page for a node associated with the node data; or updating at least one of data values or pointer information included in a previously cached page associated with the node data.

CC: The system paragraphs X, Y, Z, AA, or BB recite, further comprising a logic means, in response to receiving the query, node data and path information, sequentially allocates a page within a cache memory associated with the logic means for a node associated with the received query, the node data and the path information being based at least on allocation rules when the cache memory does not currently include a page associated with the node that is associated with the received query.

DD: The system paragraphs X, Y, Z, AA, BB, or CC recite, wherein the driver means, attempts to validate portions of data; in response to not being able to validate the portions of data, sends the query, node data, and path information; and further comprising a logic means, in response to receiving the query, the node data, and the path information, updates at least one of the data values or pointer information included in the previously cached page associated with at least one of the received node data or the received path information.

EE: The system paragraphs X, Y, Z, AA, BB, CC, or DD recite, wherein the driver means, stores portions of data received from the logic device within a lookup table (LUT); in response to receiving the query from the DBMS means, determines whether information stored within the LUT is associated with the received query; and sends information stored within the LUT to the DBMS means based on a determination that the information stored within the LUT is associated with the received query.

FF: The system paragraphs X, Y, Z, AA, BB, CC, DD, or EE recite, further comprising a logic means, in response to receiving the modified query, traversing nodes of a tree-type relational database data-structure previously cached in memory associated with the logic means based at least on the modified query; retrieving at least portions of data located at each traversed node; and sending the retrieved portions of data to the driver means, wherein the retrieved portions of data located at a traversed node comprise at least one of a first data value associated with a node identifier and the data value's ordinal position of the first data value within an associated cached page and at least one second data value located at a predefined location relative to the first data value and the second data value's ordinal position within the cached page.

GG: The system paragraphs X, Y, Z, AA, BB, CC, DD, or EE recite, further comprising a logic means, in response to receiving the modified query, traversing nodes of a tree-type relational database data-structure previously cached in memory associated with the logic means based at least on the modified query; retrieving at least portions of data located at each traversed node; and sending the retrieved portions of data to the driver means, wherein the retrieved portions of data located at a traversed node comprise at least one of a first data value associated with a node identifier and the data value's ordinal position of the first data value within an associated cached page and at least one second data value located at a predefined location relative to the first data value and the second data value's ordinal position within the cached page, wherein the first data value comprises lower and upper bounded values associated with the node identifier, wherein the second value comprises a value located at an ordinal position that is at least one less than the lower bounded value and a value located at an ordinal position that is at least one greater than the upper bounded value.

HH: The system as paragraphs X, Y, Z, AA, BB, CC, DD, EE, FF, or GG, wherein the page comprises a value location and a pointer location, the pointer location being logically separated from the value location.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple suboperations, and/or executed in parallel to implement the described processes. The described processes can be performed by resources associated with one or more device(s), such as one or more internal or external CPUs or GPUs, and/or one or more pieces of hardware logic, such as FPGAs, DSPs, or other types of accelerators.

All of the methods and processes described above may be embodied in, and fully automated via, software code modules executed by one or more general-purpose computers or processors. The code modules may be stored in any type of computer-readable storage medium or other computer storage device. Some or all of the methods may alternatively be embodied in specialized computer hardware.

Any routine descriptions, elements, or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved, as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   at a database management system (DBMS) at least partially embodied in computer-readable media executable by one or more hardware processors, in response to receiving an external query, sending a query to a driver;
   at the driver at least partially embodied in computer-readable media executable by one or more hardware processors, in response to receiving the query from the DBMS, sending a modified query to a hardware logic device;
   at the hardware logic device, in response to receiving the modified query,
      traversing nodes of a tree-type relational database data-structure previously cached in memory associated with the hardware logic device based at least on the modified query, the tree-type relational database data-structure associated with a complete tree-type data structure maintained by the DBMS;
      retrieving at least portions of data located at each traversed node in the cached memory, including boundary data of each traversed node;
      determining ordinal positions of the boundary data of the traversed nodes; and
      sending the retrieved portions of data and the ordinal positions of the boundary data to the driver; and
   at the driver, conducting a validity check of the retrieved portions of data at each traversed node using the boundary data of each traversed node, and, in response to a failed validity check of a traversed node, sending, to the hardware logic device, information about the traversed node that failed the validity check.

2. The method of claim 1, wherein traversing nodes of the tree-type relational database data-structure previously cached in memory includes performing an eager traversal.

3. The method of claim 1, further comprising:
   at the driver, in response to receiving portions of data from the hardware logic device, validating the portions of the data based at least on associated data stored at one of the one or more tree-type relational database data-structures associated with the DBMS; and
   in response to validating the portions of the data, sending the validated portions of the data to the DBMS.

4. The method of claim 1, wherein the query is a node-level query comprising at least a query value and data located at an associated node, wherein the modified query is a tree-level request comprising the query value and a node identifier.

5. The method of claim 1, further comprising:
   at the driver,
   in response to receiving portions of data from the hardware logic device, determining whether the received portions of the data are inconsistent; and
   in response to determining that the received portions are inconsistent, sending the query, node data and path information to the hardware logic device; and
   at the hardware logic device, in response to receiving the query, the node data and the path information, performing at least one of:
      allocating a page for a node associated with the node data; or
      updating at least one of data values or pointer information included in a previously cached page associated with the node data.

6. The method of claim 1, further comprising:
   at the hardware logic device, in response to receiving the modified query, node data and path information, sequentially allocating a page within a cache memory associated with the hardware logic device for a node associated with the received modified query, the node data and the path information being based at least on allocation rules when the cache memory does not currently include a page associated with the node that is associated with the received modified query.

7. The method of claim 1, further comprising:
at the driver,
attempting to validate portions of data sent from the hardware logic device; and
in response to not being able to validate the portions of data, sending the query, node data, and path information to the hardware logic device; and
at the hardware logic device, in response to receiving the query, the node data, and the path information and after the hardware logic device previously sent the portions of data, updating at least one of the data values or pointer information included in the previously cached page associated with at least one of the received node data or the received path information.

8. The method of claim 1, further comprising:
at the driver,
storing portions of data received from the hardware logic device within a lookup table (LUT);
in response to receiving the query from the DBMS,
determining whether information stored within the LUT is associated with the received query; and
sending information stored within the LUT to the DBMS based on a determination that the information stored within the LUT is associated with the received query.

9. The method of claim 1, wherein the retrieved portions of data located at a traversed node comprise at least one of a first data value associated with a node identifier and the first data value's ordinal position of the first data value within an associated cached page and at least one second data value located at a predefined location relative to the first data value and the second data value's ordinal position within the cached page.

10. The method of claim 1,
wherein the retrieved portions of data located at a traversed node comprise at least one first data value associated with a node identifier and an ordinal position of the at least one first data value within an associated cached page and at least one second data value located at a predefined location relative to the at least one first data value and the at least one second data value's ordinal position within the cached page, and
wherein the at least one first data value comprises at least one of a lower bounded value or an upper bounded value associated with the node identifier, wherein the at least one second value comprises at least one of a value located at an ordinal position that is at least one less than the lower bounded value or a value located at an ordinal position that is at least one greater than the upper bounded value.

11. A system comprising:
a database management system (DBMS) at least partially embodied in a computer-readable media executable by one or more hardware processors, wherein the DBMS, in response to receiving an external query, is arranged to send a query;
a driver at least partially embodied in a computer-readable media executable by one or more hardware processors, wherein the driver, in response to receiving the query from the DBMS, is arranged to send a modified query; and
a logic device, at least partially embodied in hardware, including a cache memory to store a tree-type relational database data-structure associated with at least a portion of one or more tree-type relational database data-structures associated with the DBMS, the logic device, in response to receiving the modified query, is arranged to:
traverse nodes of the tree-type relational database data-structure stored in the cache memory based at least on the modified query;
retrieve portions of data located at each traversed node including boundary data of each traversed node;
determine ordinal positions of the boundary data of the traversed nodes;
send the retrieved portions of data and the ordinal positions of the boundary data to the driver; and
receive, from the driver, information about a traversed node that failed a validity check, conducted by the driver, of the retrieved portions of data at the traversed node using the boundary data of the traversed node from the logic device.

12. The system of claim 11, wherein traversing nodes of the tree-type relational database data-structure previously cached in memory includes performing an eager traversal.

13. The system of claim 11, wherein the driver, in response to receiving the portions of data,
validates the portions of the data, based at least on data stored at one of the tree-type relational database data-structures associated with the DBMS; and
sends the validated portions of the data to the DBMS.

14. The system of claim 11, wherein the query is a node-level query comprising at least a query value and data located at an associated node, wherein the modified query is a tree-level request comprising the query value and a node identifier.

15. The system of claim 11, wherein
the driver, in response to receiving portions of data,
determines whether the received portions of the data are inconsistent; and
in response to determining that the received portions of the data are inconsistent, sends the query, node data and path information to the logic device; and
the logic device, in response to receiving the query, the node data, and the path information, performs at least one of:
allocating a page for a node associated with the node data; or
updating at least one of data values or pointer information included in a previously cached page associated with the node data.

16. The system of claim 11, wherein the logic device, in response to receiving the modified query, node data and path information, sequentially allocates a page within a cache memory associated with the logic device for a node associated with the received modified query, the node data and the path information being based at least on allocation rules when the cache memory does not currently include a page associated with the node that is associated with the received modified query.

17. The system of claim 11, wherein the driver,
attempts to validate portions of data sent from the logic device; and
in response to not being able to validate the portions of data, sends the query, node data and path information, and
the logic device, in response to receiving the query, the node data, and the path information after the logic device previously sent the portions of data, updates at least one of the data values or pointer information included in the previously cached page associated with at least one of the received node data or the received path information.

18. The system of claim 11, wherein the driver,
    stores portions of received data received from the logic device as nodes within a lookup table (LUT);
    in response to receiving the query from the DBMS, determines whether information stored within the LUT is associated with the received query; and
        sends information stored within the LUT to the DBMS based at least on a determination that the information stored within the LUT is associated with the received query.

19. The system of claim 11, wherein the retrieved portions of data located at a traversed node comprise at least one first data value associated with a node identifier and an ordinal position of the first data value within an associated cached page and at least one second data value located at a predefined location relative to the first data value and an ordinal position of the second data value within the cached node.

20. The system of claim 11, wherein the at least one first data value comprises at least one of a lower bounded value or upper bounded value associated with the node identifier and wherein the at least one second value comprises at least one of a value located at an ordinal position that is at least one less than the lower bounded value or a value located at an ordinal position that is at least one greater than the upper bounded value.

* * * * *